UNITED STATES PATENT OFFICE.

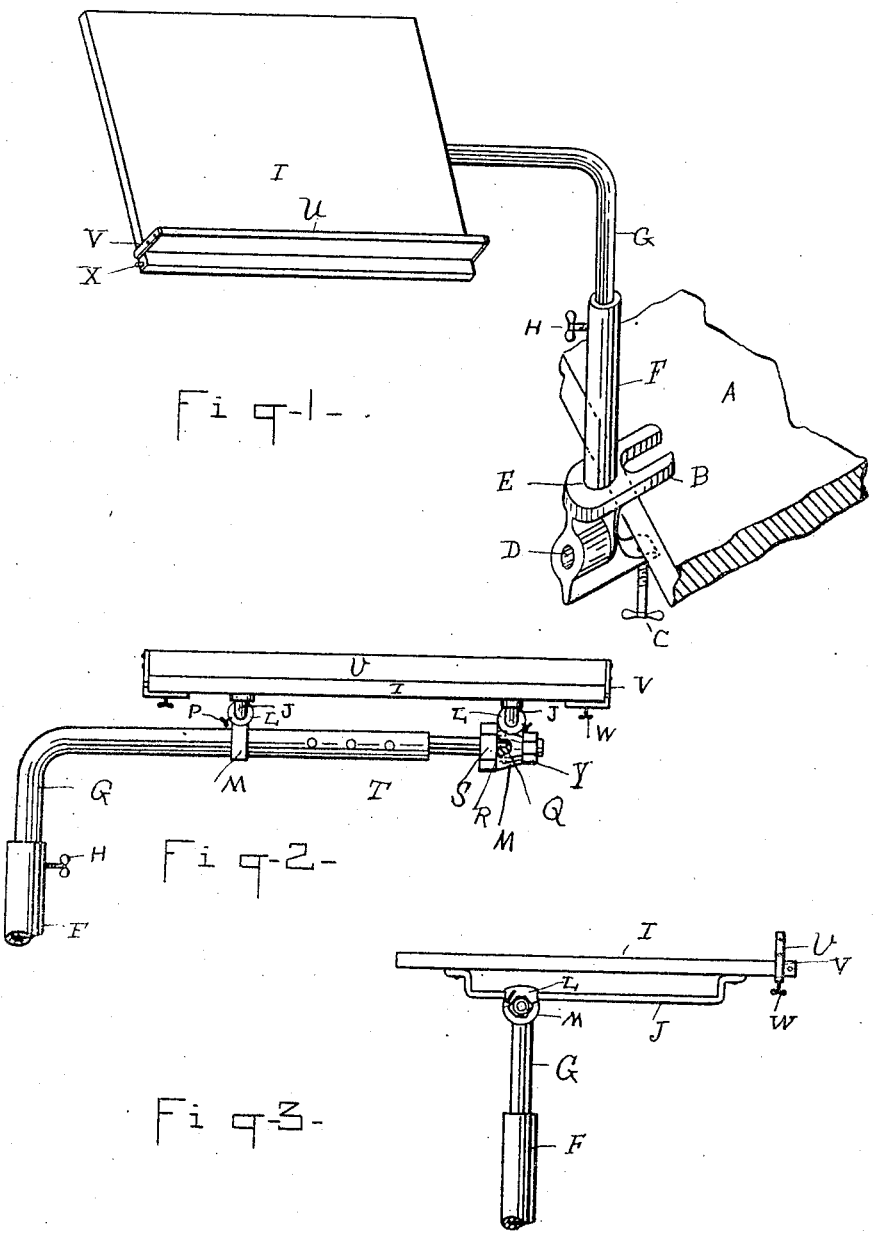

JAMES W. CASH, OF WESTBROOK, MAINE.

ADJUSTABLE TABLE.

No. 892,133.    Specification of Letters Patent.    Patented June 30, 1908.

Application filed July 29, 1907. Serial No. 385,955.

*To all whom it may concern:*

Be it known that I, JAMES W. CASH, a citizen of the United States, residing at Westbrook, in the county of Cumberland and State of Maine, have invented new and useful Improvements in Adjustable Tables, of which the following is a specification.

My invention relates to improvements in adjustable tables. It is adapted to be attached to any suitable support, chair, table, bed, etc. It is adjustable vertically, horizontally in a rotary plane, vertically in a rotary plane and longitudinally in a horizontal plane.

In the drawings herewith accompanying and making part of this application, Figure 1 is a perspective view of my device shown attached to a horizontal support, part of the support being broken away; Fig. 2 is a side elevation of the same, the clamping device being omitted and Fig. 3 is an end elevation, the clamping device being omitted.

Same letters of reference refer to like parts.

In said drawings A represents a support which may be a table, a chair, a bed frame, etc. It can be attached to any part thereof, whether said part be horizontal or vertical. My device is adapted to be attached by any suitable clamp as B and said clamp is provided with a holding set screw C. The clamp is provided with two sockets D and E, one at right angles to the other, the hole E being adapted to receive the support F when the clamp is attached to a horizontal support and the hole D adapted to receive said support F when the clamp is attached to a vertical support. In the drawing I have shown the clamp attached to a horizontal support and the support F inserted in the hole E. A bent bracket G is slidably mounted in the post F and is held in any particular position by means of a set screw H. The table I has two transversely extending brackets J secured to the under side thereof. Adapted to slide on these brackets are sleeves L. The horizontal end of bracket G passes through lugs M made integral with sleeves L in such manner that the sleeves and therewith the table may rotate upon said horizontal end. The sleeves are adapted to be held in any desired position upon said brackets in any convenient manner as by means of set screws P. The sleeves are held against rotation upon said bent end of the bracket in any convenient manner, of which I have shown one. In that shown the lug on the outer end is provided with a series of sockets Q into which takes a pin R on a collar S rigidly secured to the bracket and on the end of the bracket outside the lug is a nut Y which when screwed up forces the lug into contact with the pin on the collar. The horizontal part of bracket G may be made in two parts as shown in Fig. 2, one telescoping the other, one sleeve adapted to slide on the bracket, thus permitting the table to be adjusted horizontally or longitudinally relative to the supporting post. It can be held in any given place by means of a lock pin not shown passing through holes T, said holes being arranged in series and extending through both parts of the bent arm.

The table I is provided with a sliding guard U which may be held in place by means of irons V attached to the ends thereof, one portion of the angle iron extending under the table. The guard is adapted to slide to and fro over the surface of the table and to be held in any given position by means of set screws W or it may be held from slipping off the table by means of pins X attached to the edge of the table, as seen in Fig. 1, in which case set screws would be unnecessary. When set screws are used the guard, when the set screws are loosened, may be entirely removed from the table as is also the case when the pins X are used only at one point on the table.

The operation of my improved device is as follows: If the article to which the table is to be attached is horizontal, the post F will be inserted in hole E in the bracket, and, if it is vertically positioned, the post F will be inserted in hole D. The bracket is adjustable vertically by sliding it up and down relative to the post and is locked in any given place by means of set screw H. The table is adjustable transversely of the bracket G by sliding in the sleeves of the lugs. The lugs and table rotate around the bracket so that the table may assume any angle relative to the floor and may be held in any given position as above described. It will be evident that the table may rotate around the post assuming any position in the arc of a circle. The table may also be adjusted longitudinally relative to the post as before described.

The advantages of my improved table support are that it may be attached at will to a vertical or a horizontal base. The table is adjustable vertically, horizontally relative to the post in a horizontal circle around the post, and in a vertical circle relative to the floor, being in fact universally adjustable. It is simple in construction, easily attached and detached and readily adjustable to any desired position. The guard may be entirely removed from the table or may be moved to and held in any position on the face thereof. It may be used for a great variety of purposes.

Having thus described my invention and its use I claim:—

1. In combination, a clamp, a post mounted on said clamp, a bent bracket one arm rotatably and slidably mounted on said post and the other arm comprising two parts joined together telescopically, a table mounted upon said last mentioned arm at two points, one point on each of said telescoping members, one point of contact being slidably attached to the bracket and the other point of contact being rigidly attached thereto, and means for holding the two parts of the bracket in any given position.

2. In combination, a clamp, a post attached thereto, a supporting bracket, a lug slidably mounted on said bracket, a lug rotatably mounted on said bracket, means for holding said lug against rotation thereon, a table provided with brackets on the under side thereof and sleeves rigidly secured to said lugs, said brackets being slidably mounted in said sleeves.

3. In combination, a clamp, a post attached thereto, a bracket mounted upon said post, a table mounted upon said bracket, said table being adapted to have, vertical, horizontal and rotary adjustment relative to said post and rotary and transverse adjustment relative to said bracket.

In testimony whereof, I have signed this specification in presence of two subscribing witnesses this 25th day of July, A. D. 1907.

JAMES W. CASH.

In presence of—
ELGIN C. VERRILL,
MARION RICHARDS.